(12) United States Patent
Leung et al.

(10) Patent No.: US 7,496,216 B2
(45) Date of Patent: Feb. 24, 2009

(54) FINGERPRINT CAPTURE

(75) Inventors: Sui-hing Leung, Cupertino, CA (US); Sean Xiao-An Zhang, Cupertino, CA (US); Chung Ching Yang, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 618 days.

(21) Appl. No.: 11/157,649

(22) Filed: Jun. 21, 2005

(65) Prior Publication Data

US 2006/0285728 A1 Dec. 21, 2006

(51) Int. Cl.
*G06K 9/00* (2006.01)

(52) U.S. Cl. ........................ 382/124; 382/125

(58) Field of Classification Search ................ 382/124
See application file for complete search history.

(56) References Cited

U.S. PATENT DOCUMENTS

| | | | | |
|---|---|---|---|---|
| 5,852,670 A | * | 12/1998 | Setlak et al. | 382/126 |
| 5,956,415 A | * | 9/1999 | McCalley et al. | 382/124 |
| 5,963,679 A | * | 10/1999 | Setlak | 382/312 |
| 5,995,641 A | * | 11/1999 | Yamaguchi | 382/124 |
| 6,088,471 A | * | 7/2000 | Setlak et al. | 382/124 |
| 6,317,508 B1 | * | 11/2001 | Kramer et al. | 382/124 |
| 6,323,776 B1 | * | 11/2001 | Jackson et al. | 340/679 |
| 6,333,989 B1 | * | 12/2001 | Borza | 382/124 |
| 6,408,087 B1 | * | 6/2002 | Kramer | 382/124 |
| 6,643,389 B1 | * | 11/2003 | Raynal et al. | 382/124 |
| 7,079,672 B2 | * | 7/2006 | Matsumoto et al. | 382/125 |
| 2001/0040987 A1 | * | 11/2001 | Bjorn et al. | 382/124 |
| 2002/0181749 A1 | * | 12/2002 | Matsumoto et al. | 382/125 |
| 2005/0089200 A1 | * | 4/2005 | Nysaether | 382/124 |
| 2005/0141048 A1 | * | 6/2005 | Mizutani | 382/124 |
| 2005/0281441 A1 | * | 12/2005 | Martinsen et al. | 382/124 |
| 2006/0285728 A1 | * | 12/2006 | Leung et al. | 382/124 |

\* cited by examiner

*Primary Examiner*—Matthew C. Bella
*Assistant Examiner*—Sath V. Perungavoor

(57) ABSTRACT

A system and method of capturing a skin print from skin having ridges and valleys. A skin print sensor having a return/supply contact and a plurality of contact pads is provided. A finger is applied to the skin print sensor and data is stored representative of contact pads in contact with skin ridges.

24 Claims, 5 Drawing Sheets

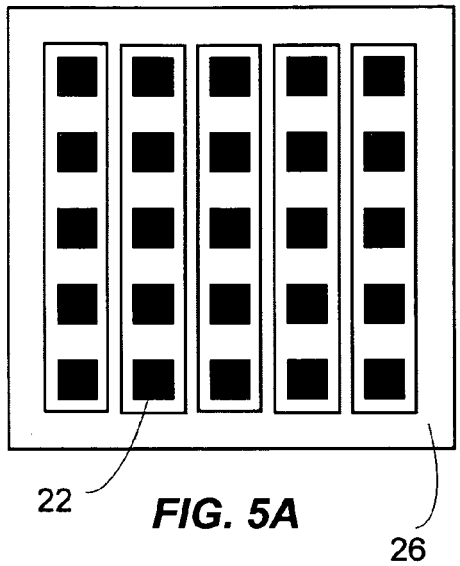
22   *FIG. 5A*   26
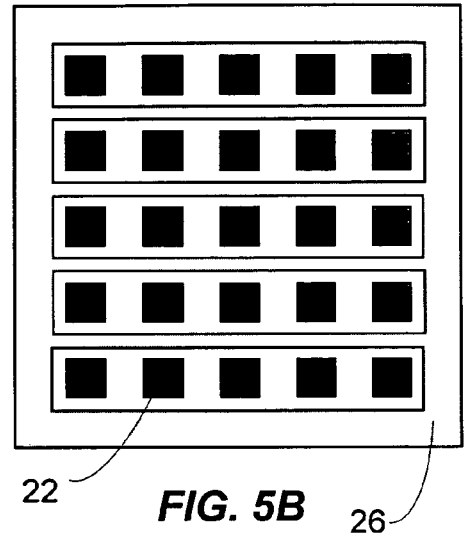
22   *FIG. 5B*   26
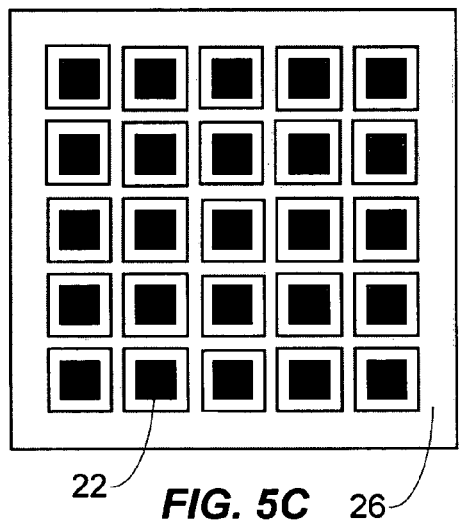
22   *FIG. 5C*   26
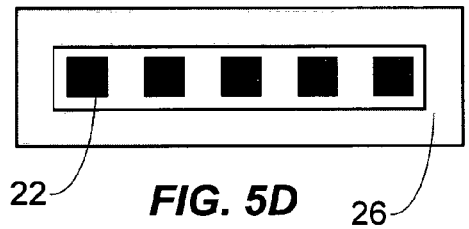
22   *FIG. 5D*   26
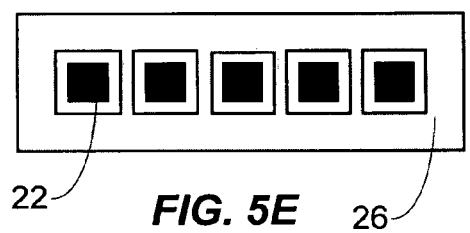
22   *FIG. 5E*   26
■ Contact pads 22
□ Return/Supply 26

FINGERPRINT CAPTURE

BACKGROUND

Fingerprint recognition has a number of important, attractive and desirable attributes. No two individuals have the same fingerprint. In addition, details in each fingerprint are permanent and do not change over time.

Present-day fingerprint sensors can be broadly classified into one of the three main technologies: optical, ultrasound and solid state. Each of these sensors has their advantages and drawbacks. Optical and ultrasound sensors usually require more complicated mechanical parts and therefore, they usually are bulkier in size and more expensive to produce. Solid state sensors, on the other hand, are lower in cost and more compact.

Solid state sensors to date are based on capacitive, thermal, piezoelectric and electric field technologies. A major drawback of currently available solid state sensors is their inability to consistently capture a fingerprint image with a sufficiently good signal-to-noise ratio (SNR).

BRIEF DESCRIPTION OF THE DRAWINGS

FIGS. 5a-e illustrate alternate embodiments of the conductive fingerprint array sensor shown in FIG. 3a;

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
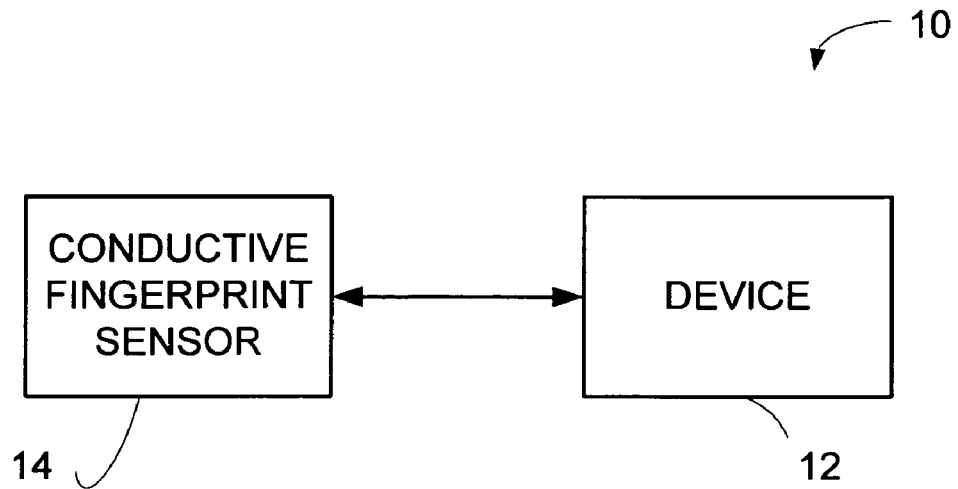
FIG. 1 illustrates a system having a conductive fingerprint array sensor according to one example embodiment of the present invention.

FIG. 1 illustrates a system 10 having a conductive fingerprint array sensor 14. System 10 restricts access to a device 12 until a user is authenticated via conductive fingerprint array sensor 14.

Figure 2:
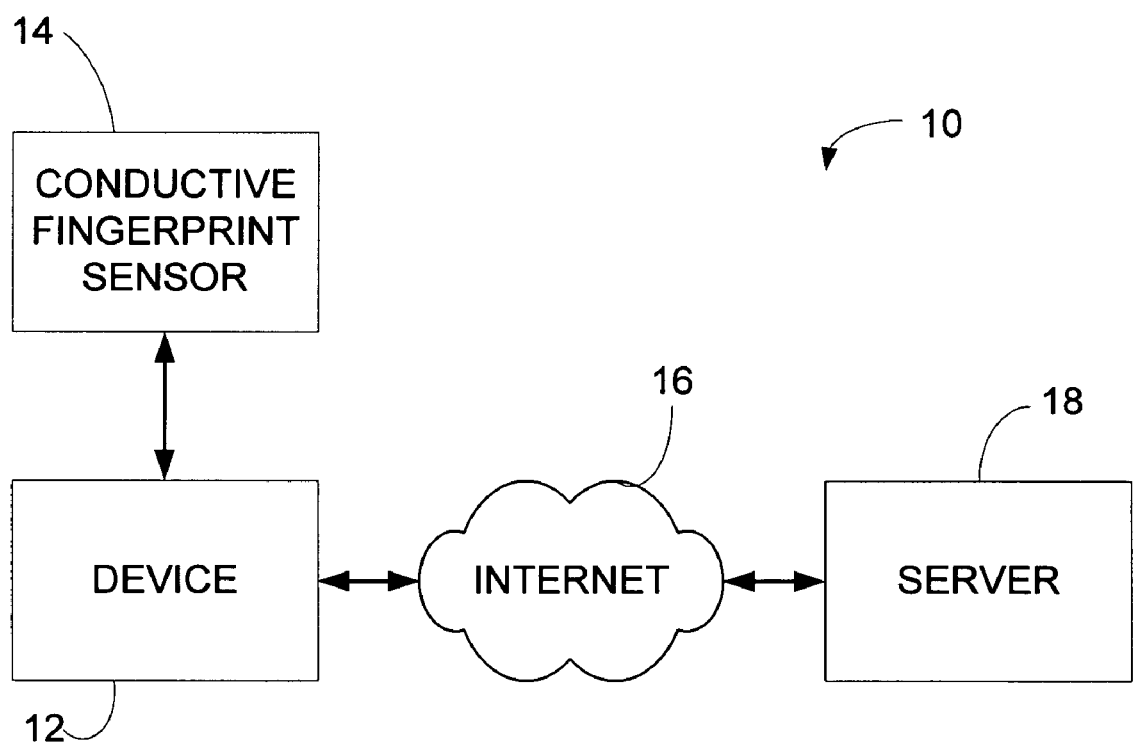
FIG. 2 illustrates another system having a conductive fingerprint array sensor according to one example embodiment of the present invention.

FIG. 2 illustrates another system 10 having a conductive fingerprint array sensor 14 and a device 12. Device 12 is connected through a network 16 to a server 18. System 10 restricts access to device 12 and server 18 until a user is authenticated via conductive fingerprint array sensor 14. Examples of networks 16 include the Internet and wired or wireless networks configured as local or wide area networks. In one embodiment, authentication of the user is performed within device 12. In another embodiment, authentication of the user is performed within server 18.

Figure 3A:
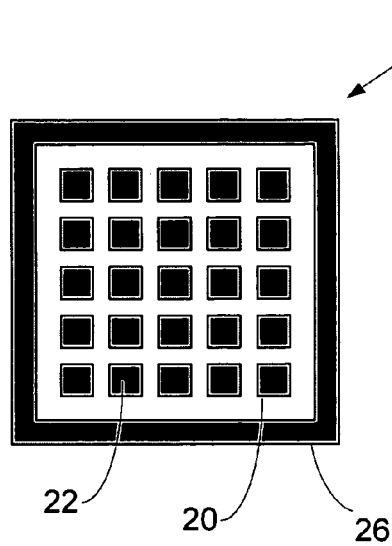
FIGS. 3a and 3b illustrate top and sectional views, respectively of a conductive fingerprint array sensor according to one example embodiment of the present invention.
Figure 3B:
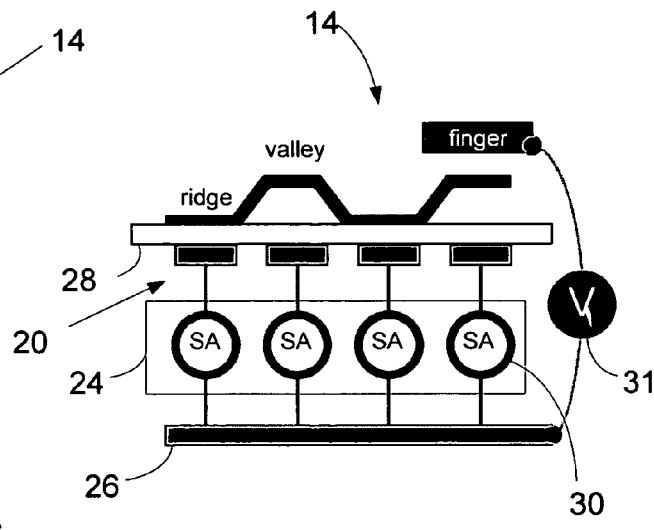

FIGS. 3a and 3b illustrate top and sectional views, respectively of one embodiment of conductive fingerprint array sensor 14. In the embodiment shown, conductive fingerprint array sensor 14 includes an array 20 of contact pads 22, sensing electronics 24 and a return/supply contact such as return/supply ring 26. In one such embodiment, sensor 14 further includes an anisotropic conductive layer 28. Sensing electronics 24 includes one or more sense amplifiers 30. In one such embodiment, each contact pad 22 is connected to a separate sense amplifier 30.

FIG. 3a is a top view illustrating the arrangement of the array 20 of the contact pads 22 and the encompassing return/supply ring 26. FIG. 3b is a sectional view illustrating array sensor 14 when a finger is placed on top of the sensor.

From the viewpoint of fingerprint mapping, human fingerprints have ridges and valleys which are typically spaced at about 150 to 200 um apart from each other. In other words, human fingerprints have a spatial wavelength in the range of 300 to 400 um. To faithfully capture a fingerprint pattern, sensors should have a spatial resolution better than 150 um.

The two-dimensional array of contact pads 22 as shown in FIG. 3a are the conductivity sensors that will map a fingerprint pattern into a bitmap and convert it into electronic form. If a spatial resolution of 150 um or better is desired, in the embodiment shown the contact pads should have a pitch less than or equal to 150 um. A reasonable pitch is 127 um, which translates to a density of 200 sensors per inch, or 200 spi.

In one embodiment, a square area of roughly 0.5 inches on a side is sufficient to cover the central portion of the fingerprint for authentication or verification purposes. Using the above parameters, that would mean that a square sensor array of roughly 0.5 inches per side will have on the order of 10,000 individual sensors.

One way to implement the conductivity fingerprint sensor at this density is to integrate the sensors and the attendant electronics in a single silicon chip. The sensing pads could be patterned on a silicon wafer either by (1) a straightforward thermal evaporation, deposition or sputtering through a shadow mask, (2) lithographically etching of a pre-deposited conductive thin film (typically metal), or (3) by a localized high level doping. Each sensor could be connected directly to its dedicated Sense Amplifier (SA) 30 or to certain shared sense amplifiers through a multiplexing network to be discussed later. The sense amplifiers, operating either in a voltage mode or in a current mode, are used to image fingerprint patterns as described below.

In the embodiment shown in FIG. 3b, the array of contact pads 22 is surrounded by an electrically conductive loop called return/supply ring 26. As shown in FIG. 3b when a finger is pressed on the fingerprint array sensor, a certain part of the finger will come in contact with the return/supply ring 26. At the same time the high spots (the "ridges") will also make contact with the individual sensors under the ridges. An electric circuit will be completed between the sensor pad under a ridge and the return/supply ring through the finger. Sense amplifier 30 connected to the sensor pad will register a signal (an electric current) indicating the presence of a ridge. Low spots on the fingerprint, called the "valleys", will not come in contact with the sensing pads and therefore will not complete the circuit. Consequently no signal (other than some residual leakage or systematic noise) will register on the corresponding SA's. After filtering or conditioning the SA signals, a truthful mapping of the fingerprint pattern will be obtained.

In another embodiment, the return/supply contact doesn't surround the array of contact pads 22 but instead is positioned so that a finger comes in contact with the return/supply contact in normal use, completing the necessary electrical circuit.

The output from the SA could be binary or analog (continuous) by nature depending on the design of the SA. A certain form of threshold detection as in a voltage comparator could be incorporated in the SA's so it will directly produce a binary output. The primary advantage of a binary bitmap is that it is compact in size and thus easier and faster to process. However, the downside is that some detail may be forever lost in a binary image as a result of the thresholding process. On the other hand, an analog (continuous tone) image usually preserves both the fidelity of as well as the impairment (noise) in the original image. Subsequent in situ or ex situ signal and/or two-dimensional image processing could make full use of the contents in the analog signal to enhance its quality and improve image signal-to-noise ratio, or SNR.

In one embodiment, the analog output signal, which is obtained from a certain type of linear or nonlinear sense amplifier discussed later, is digitized with the aid of an ADC so that subsequent processing, manipulation or storage can take place in the digital domain.

As shown in FIG. 3b, in one embodiment, a layer of anisotropic conductive layer 28 is formed by depositing a film, polymer or suitable material on top of the array 20 of contact pads 22. The main purpose of such a layer is to protect the contact pads and the silicon integrated circuit from mechanical wear and environmental contaminants, especially the oils and sweats from the fingers being mapped. In one such embodiment, the anisotropic layer 28 shown in FIG. 3b has a relatively high electrical conductivity perpendicular to the plane but a relatively poor conductivity along the plane. The anisotropic protective layer essentially isolates the sensing elements from the hostile environment while still presenting the underlying geometric conductive pattern of the sensor array to the user. The anisotropic layer will be discussed in greater detail below.

For the sense amplifiers 30 to sense a fingerprint pattern in this scheme, a voltage source is used in the circuit loop. In one embodiment, a voltage source 31 is applied to the Return/Supply ring 28 as shown schematically in FIG. 3b. It should be pointed out that voltage source 31 is not limited to a direct current (DC) source, although this would typically be the simplest method. For example, voltage supply 31 could also be a pulsed power supply or a sinusoidal or non-sinusoidal alternating current (AC) power supply. The sense amplifier design may not be the same under various forms of excitation but the general principle applies.

In one embodiment, fingerprint array sensor 14 is operated in a mixed mode. DC measurements typically would be the simplest, fastest and most direct way to use sensor 14 but, in one embodiment, if the results achieved by DC measurements appear unsatisfactory, the operation could be, if necessary, switched to an AC mode. In one such embodiment, DC and AC measurements are correlated to improve the SNR. In addition, to provide a better immunity to noise and spurious disturbance, when AC excitation is used sensor 14 uses synchronous detection, a lock-in amplifier technique, or a tuned circuit to sense the signal from the contact pads 22.

Figure 4A:
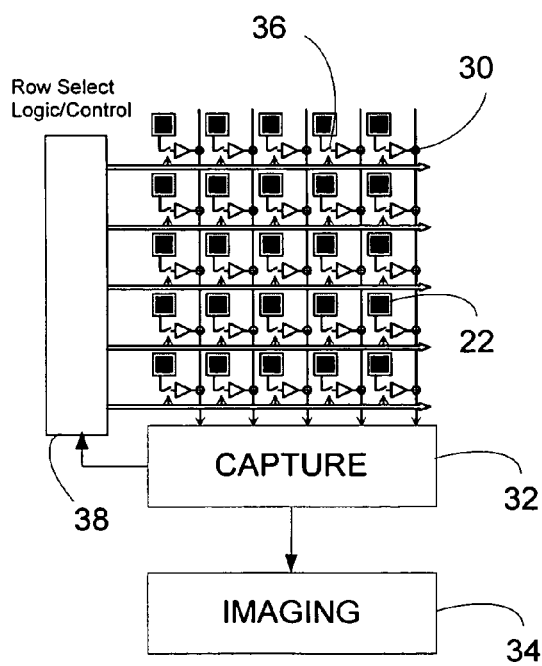
FIGS. 4a and 4b illustrate two embodiments of sense amplifier multiplexers which can be used in the conductive fingerprint array sensor of FIGS. 3a and 3b.
Figure 4B:
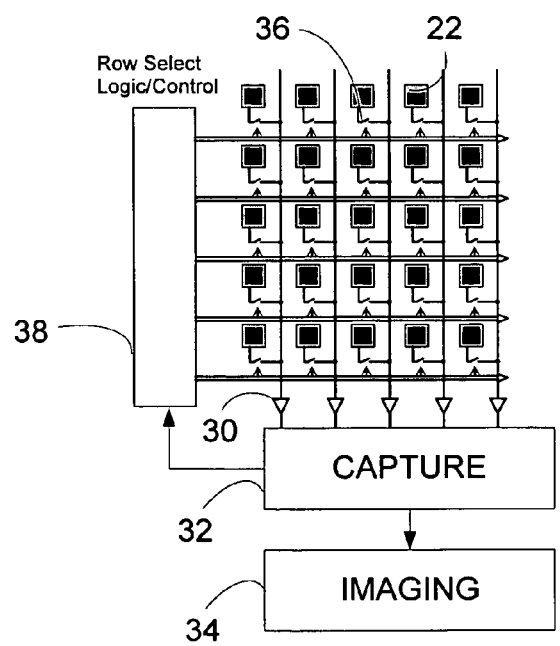

FIGS. 4a and 4b illustrate two embodiments of a conductive fingerprint sensor 14. In each embodiment, contact pads 22 are arranged in an m-row by n-column rectangular array. Sense amplifiers 30 are electrically connected to both the contact pads and a capture circuit 32. Capture circuit 32 captures data from the sense amplifiers 30 representative of skin in electrical contact with one or more of the contact pads 22. Capture circuit 32 is connected in turn to an imaging module 34. Imaging module 34 receives data representative of skin in electrical contact with one or more of the contact pads from capture circuit 32 and converts the data received into data representative of a skin print. A skin print can be made of skin on a fingertip (e.g., a fingerprint) or of any skin having discernable valleys and ridges.

In the embodiment shown in FIG. 4a, m×n sense amplifiers 30 and analog switches 36 are used. Row Select and Control Logic 38 under the control of capture circuit 32 (or other control circuit) selectively turns on the appropriate switch 36 or switches 36 so the voltage on or the current through the sensing pad 22 can be measured. Any number of sense amplifiers 30 (up to n) in a selected row could be enabled in parallel at the same time depending on the design goal. Higher data throughput could be obtained when more amplifiers within the same row are accessed simultaneously. To conserve power at the expense of operating speed, it is possible to scan the sense amplifiers within the same row in column-wise sequential manner.

It is also possible to substantially reduce the number of sense amplifiers 30 used to monitor the contact pads. As shown in FIG. 4b, only n sense amplifiers 30 are used while the number of analog switches 36 remains the same. The outputs from the contact pads 22 in any one column share the same column sense amplifier 30.

Such a scheme may, in certain situations, be more susceptible to performance degradations. Noise could be introduced, for instance, by the length of the trace feeding the shared sense amplifier, by imperfect isolation of the analog switches and/or by noise introduced by the switches 36.

The dynamics of sensor 14 will be discussed next.

The electrical resistance of a human finger is highly dependent upon the moisture content on the epidermal layer. The resistance of a dry finger could be greater than 10 M ohms while that of a wet or sweaty finger could easily reach the kilohm range. Thus, sense amplifier 30 should have a wide dynamic range to handle the two extreme cases. One way of accomplishing a wide dynamic range is to make use of logarithmic sense amplifiers, which have a logarithmic or near-logarithmic transfer characteristic. Since we are not too concerned with an accurate measurement of the resistance in this application, near-logarithmic sense amplifiers will suffice as long as their transfer behavior is reasonably monotonic.

Another approach is to apply an auto-ranging scheme. Under this method, at the start of a measurement cycle a certain predetermined supply voltage is applied to return/supply ring 26. A partial scan through some contact pads 22 will yield measurement data indicating whether the sense amplifiers 30 are operating in the optimum conditions where the Signal-to-Noise ratio (SNR) is usually the highest.

In the case of the sense amplifiers 30, when the output signal is at approximately 50% of its full-scale excursion, they are presumed to be running at close to optimal conditions. If the sample signal were too low, for example when the finger is dry, the supply voltage would be adjusted upwards based on certain rules or algorithm. The adjust-and-test cycle is repeated iteratively until an optimal operating condition or a certain limiting condition is reached. In one such embodiment, sensor 14 includes a circuit to ensure that the supply voltage never is allowed to reach a level sufficient to cause an electrical shock to the user.

Similarly, if the initial partial scan shows the sense amplifiers are near or at saturation, the adjustment would be in the downward direction instead.

It has to be pointed out that though the sense amplifiers are most likely linear amplifiers, they do not have to be since the accuracy of the measurements is not too important in this application. The only requirement is that the output-input relationship is monotonic. As a matter of fact it can be advantageous to use a somewhat nonlinear but monotonic sense amplifier having a "soft" saturation characteristic. Thus a logarithmic, near-logarithmic or other appropriate nonlinear sense amplifier could be incorporated in an auto-ranging scheme in this fingerprint mapping apparatus.

A variant of the aforementioned auto-ranging scheme is described in this paragraph. Instead of using the same fixed supply voltage as determined to measure the resistance presented at the contact pads, we could individually vary or sweep the supply voltage at each and every contact pad 22 so as to obtain a certain prescribed output level from the corresponding sense amplifier. In this way, as the contact pads 22 are scanned sequentially, the supply voltage that results in the same output from the sense amplifier will be recorded. A fingerprint pattern could be inferred from the supply voltages thus obtained. Note that in this scheme, the supply voltage bears an inverse relationship to the local resistance at that contact pad 22. In one such embodiment, a digital-to-analog (DAC) converter is used to produce the varying supply voltage. In another such embodiment, an analog-to-digital converter is used to measure the supply voltage generated by other means.

In yet another auto-ranging approach, the gain of the sense amplifier is adjusted dynamically as necessary to achieve the desired range.

A method of detecting shorts in sensor 14 will be discussed next. Though the auto-ranging fingerprint sensor 14 described above would be capable of operating with a relatively large dynamic range (e.g., 5 or 6 orders of magnitude), the spread of the measurement data for a particular individual at any one time would tend to cluster within one or two orders. In other words, the standard deviation of the data collected for a particular individual under a particular setting at any one time would typically fall within an order or two from the statistical mean.

In one embodiment, we exploit the statistical nature of the data (1) to detect whether any contact pad might be shorted, (2) to detect contamination and (3) to discern whether the fingerprint map comes from a live person or from a fake finger. Note that in order to perform statistical data analysis, output from the sense amplifiers should be an analog signal. Shorts on the contact pads could be detected, however, without requiring an analog output signal from the sense amplifiers 30.

In an idle state where supposedly no finger is placed on the sensor, all contact pads should register a relatively high resistance since they are practically open-circuited. Any substantial deviation from this expectation would mean there is a leakage path most likely due to a contaminant on or moisture around the contact pads 22. Depending on the extent of the leakage, the system software may decide to issue a warning requesting the user to wipe clean and/or dry the fingerprint sensor, or it may record the extent of the leakage immediately prior to the measurement so that correction or compensation could be applied to the measurement results.

No matter how sophisticated an authentication method may be, none is 100% secure at all times. It is feasible to defeat the conductivity fingerprint sensing scheme by fabricating a 'fake finger' using a certain type of semi-compliant conductive material or film containing a 3-dimensional copy of a fingerprint. But such a synthetic impostor would give a set of data whose statistical distribution would most likely be narrower and less varying. When there is a reason to doubt the authenticity of a fingerprint, in one embodiment, a follow up scan is initiated and compared with the prior data set. From the absolute values (i.e. the statistical mean) and the relative spread (i.e. the standard deviation) of the data sets we can arrive at a probability that the fingerprint is from a fake finger.

FIGS. 5a-e illustrate alternate embodiments of the conductive fingerprint array sensor shown in FIG. 3a. The embodiments shown in FIGS. 5a and 5b center around the return/supply element 26, which does not have to be just a loop on the periphery of the sensing pads as shown earlier in FIG. 3a. The primary advantage of these alternative configurations is that much more area is provided for the return/supply path, making possible a more consistent and less noisy measurement result. FIGS. 5a and 5b depict a striped arrangement while FIG. 5c provides a maximal opportunity of a local return/supply around each sensing pad 22 in the array.

In the embodiments shown above, the geometric shape of sensing array 20 is square. Sensing array 20 may, however, be implemented in any geometric shape. For instance, it may be advantageous to implement array 20 as a rectangular array with each side being at least 50% of another side. In one such embodiment, if one side is length m and another side is length n, m and n are substantially equal. In another embodiment, m is more than 10 times n.

In one embodiment, sensor array 20 is a linear sensor array in which m>>n>=1. In this case sensor 14 basically functions as a one-dimensional array. To get a 2-dimensional map of the fingerprint from a linear array, the user would need to swipe or scan his or her finger orthogonal to the length of sensor array. Examples of linear sensor arrays are shown in FIGS. 5d and 5e.

One benefit of a linear array as opposed to a rectangular or square array is that it takes up less area and in certain applications, such as PDA, a small footprint may be an important consideration. Since it is physically smaller it also requires less silicon wafer area and should cost less to manufacture.

Another possible benefit of a linear array comes from the swiping action the user has to perform on the sensor. Such a swiping action helps clean the sensor's surface. In one such embodiment, an appropriate capping layer is provided to minimize surface wear due to the swiping movement and to discourage contaminants from lodging in the array.

Figure 6:
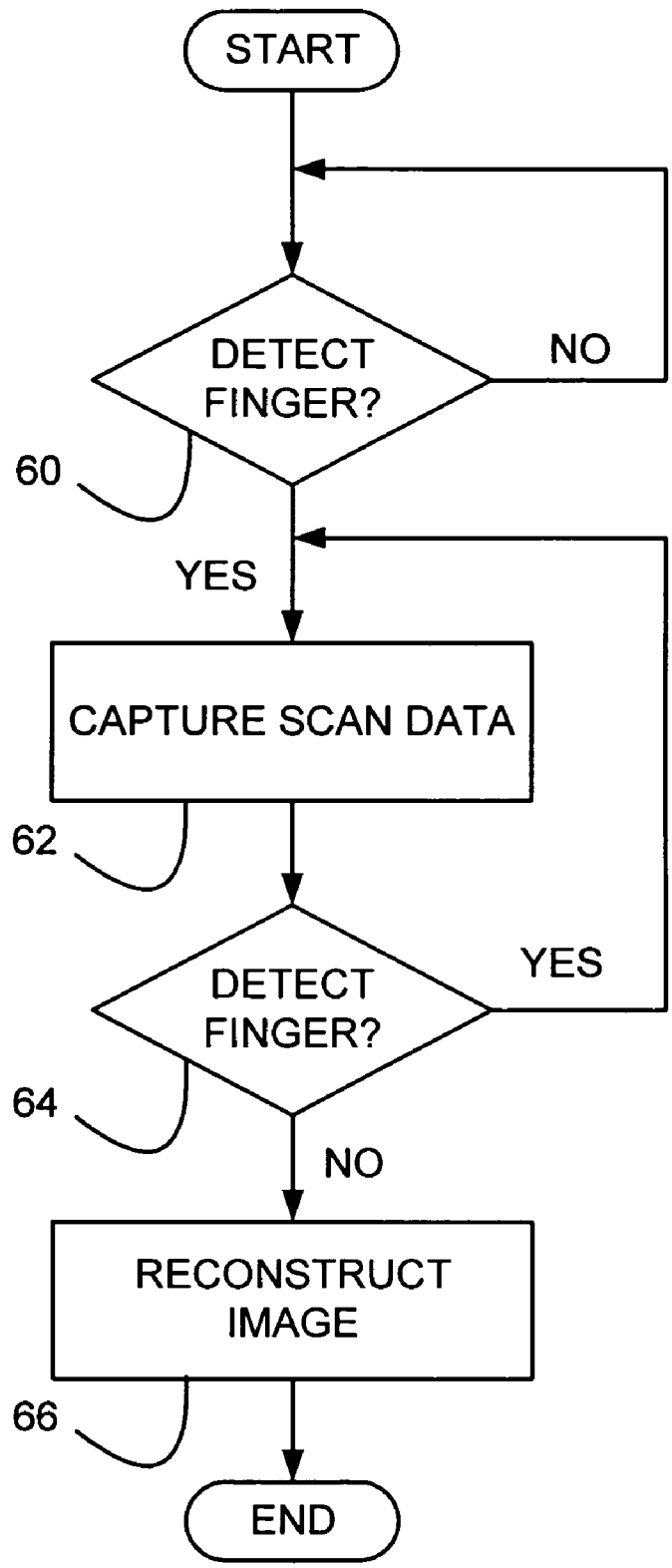
FIG. 6 illustrates a method of capturing a fingerprint.

In one linear sensor embodiment, a fingerprint monitor program, which is running at all times, detects when a user places a finger on the sensor. An embodiment of such a fingerprint monitor program is illustrated in FIG. 6. In the embodiment shown in FIG. 6, the system starts at 60 to monitor for placement of a finger on the sensor. If no finger is detected, the system stays at 60. If, however, a finger is detected, control moves to 62, where the system begins to capture sequential line scan data from the sensor array. A check is made at 64 to determine if the user still has a finger on the sensor. In one approach, completion of the data capture is signified by the user removing his or her finger from the sensor array at which time all contact pads will register static data since the contact pads are practically open-circuited.

If the check at 64 determines that the user has not removed the finger from the sensor, control moves back to 62 and another sequential line scan is captured.

If, however, the check at 64 determines that the user has removed the finger from the sensor, control moves to 66 and system software is invoked to reconstruct a 2-dimensional image from the many lines of scan data obtained.

As noted above in the discussion of FIGS. 3a and 3b, in one embodiment, a layer of anisotropic conductive layer 28 is formed by depositing a film, polymer or suitable material on top of the array 20 of contact pads 22. The main purpose of such a layer is to protect the contact pads and the silicon integrated circuit from mechanical wear and environmental contaminants, especially the oils and sweats from the fingers being mapped. The anisotropic protective layer essentially isolates the sensing elements from the hostile environment while still presenting the underlying geometric pattern of the sensor array to the user.

In applications where the anisotropic conductive layer 28 serves as a protective environmental barrier that the user would come into contact with, a solid medium should be considered.

In one embodiment, the anisotropic conductive layer 28 is selected from a material which conducts electricity vertically and very little horizontally, such as a conductive Z-Axis film adhesive. In such an embodiment, the contact pads 22 automatically map their pattern on to the surface of the anisotropic layer 28 through vertical conduction.

In another embodiment, the anisotropic conductive layer 28 is formed from a material which conducts predominately in a vertical fashion when patterned to increase vertical conductivity. In one embodiment, conductivity through anisotropic conductive layer 28 is enhanced by patterning the anisotropic film with an array of conducting paths 70 roughly aligned with the underlying contact pads 22. One such embodiment is shown in FIG. 7.

Figure 7:
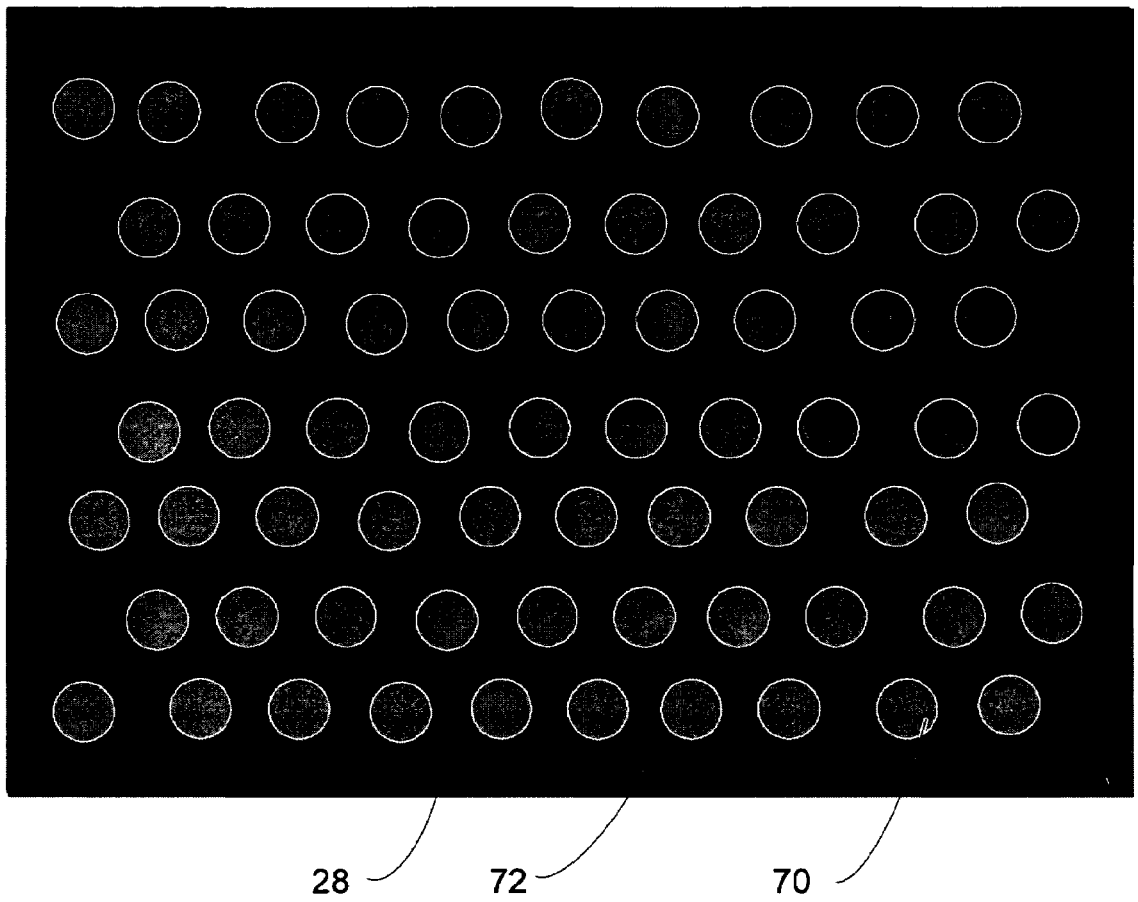
FIG. 7 illustrates a top view of an anisotropic conductive film which can be used in the conductive fingerprint array sensor according to one example embodiment of the present invention.

In the anisotropic layer 28 illustrated in FIG. 7, spots represent vertical nano-conducting paths 70 that are roughly aligned with the underlying contact pads 22, while the surrounding area 72 indicates the non-conducting or less conductive environment in which the nano-conducting paths 70 are embedded. In one such embodiment, the surface density of the conductive paths is designed to be much higher than that of the contact pads 22 so that no special alignment step is required to assemble them. This implies that for such an embodiment the mean diameter of the conducting paths is at least several times smaller than the minimum feature size of the contact pad array 20.

In another embodiment, two or more nano-conducting paths 70 are provided for each contact pad.

Material for the non-conducting or less conductive environment should have a low dielectric constant. Polymeric organic material with a low dielectric constant and a high dielectric strength is a good material choice for this application because of the ease of preparation and the simplicity of processing. An exemplary polymeric material can be polyethylene, polypropylene, PMMA, polystyrene, etc. As for a less conductive polymeric surrounding material, it could also be an un-doped or de-doped conductive polymer.

The protective anisotropic conductive film 28 can be prepared in a number of ways. In one embodiment, solid anisotropic conductive film 28 is laid over the array 20 as shown in FIG. 3b. The material selected should have a relatively high electrical conductivity perpendicular to the plane but a relatively poor conductivity along the plane.

An anisotropic conductive layer 28 can be prepared, for instance, using processes and materials such as those used in forming commercially available anisotropic conductive tape, such as 3M Scotch Brand Tape, core series 2-1300, or by following processes such as those disclosed in U.S. Pat. Nos. 6,145,897, 5,851,644, 5,769,996 and 6,110,399.

In one such embodiment, the conducting paths 70 are formed using either metallic inorganic materials (e.g. indium tin oxide), or organic or organometallic materials. The organic conductive material can be small molecules, intermolecular charge-transfer complexes or conductive polymers. To minimize the cross talk or leakage across adjacent conducting paths 70, the paths should be spaced sufficiently far from each other to achieve adequate isolation but not so far apart and in such limited number so as to impede the overall current flow through the anisotropic film 28.

In one embodiment, the conducting paths 70 are produced by printing the conductive materials directly on top of the contact pads 22. The techniques used for printing conducting material include ink-jet printing, screen-printing, and contact printing (or stamping).

Alternatively, starting with a conductive polymer layer, selective doping or de-doping chemically, electrochemically or photo-chemically will also yield an array of anisotropic conducting paths 70. Doping or de-doping can be done in a number of ways, such as contact chemical doping through contact printing (or stamping), contact electrochemical doping and selective photo-chemical doping.

The anisotropic conductive film 28 could also be prepared by aligning the conductive molecules (both small molecule and polymer) with an external e-field or electromagnetic field or a combination of both during a thermal annealing process.

An exemplary catalog of small molecules includes intermolecular charge-transfer complexes such as perylene (per) or substituted perylene, tetracyano-p-quinodimethane (TCNQ) or substituted TCNQ, tetracyanonaphthalene (TNAP) or substituted TNAP, tretrathiafulvalene (TTF) or substituted TTF (e.g., bis(ethylenedithic)-tretrathiafulvalene (BEDT-TTF)), tetraselenafulvalene (TSF) or substituted TSF (e.g., tetramethyl-tetraselenafulvalene (TMTSF)) and hexamethylenetetraselenafulvalene (HMTSF).

An exemplary list of conductive polymers includes polyaniline (PANi), substituted polyaniline or block copolymers of polyaniline; polypyrrole (PPy), substituted polypyrrole or block copolymers of polypyrrole; polythiophene (PT), substituted polythiophene or block copolymers of polythiophene; polyisothianaphthene (PITN), substituted polyisothianaphthene or block copolymers of polyisothianaphthene; polyparaphenylene (PPP), substituted polyparaphenylene or block copolymers of polyparaphenylene; polythienylene vinylene (PTV), substituted polythienylene vinylene or block copolymers of polythienylene vinylene; polyparaphenylene vinylene (PPV), substituted polyparaphenylene vinylene or block copolymers of polyparaphenylene vinylene; polyacetylene (PA), substituted polyacetylene or block copolymers of polyacetylene; and poly (phenylene sulfide) (PPS), substituted poly(phenylene sulfide) or block copolymers of poly(phenylene sulfide), etc.

The conductivity sensor described above is a new type of solid state fingerprint sensor that may promote a wider adoption of biometric authentication in many security or privacy-related applications. As noted above, a major drawback of currently available solid state sensors appears to be their inability to consistently capture a fingerprint image with a sufficiently good signal-to-noise ratio (SNR). The conductivity sensor offers a simple, compact, and yet robust and accurate method to capture consistently high SNR live-scan fingerprints. It could be particularly useful for authentication purposes in mobile or portable applications. This could also open the door for broader secured internet transactions, credit card retail and banking, and help curb the tide of identity theft.

The conductivity sensor may prove to be more robust than the other options available in the class of solid state sensors since it has a larger dynamic operating range and can operate in both AC and DC mode. It may also produce fingerprint images with less noise. Another salient feature of the conductivity sensor may be its high sensitivity since the ratio in conductance between a ridge in physical contact with a contact pad and that of a valley not touching a pad could be rather large.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) to allow the reader to quickly ascertain the nature and gist of the technical disclosure. It is submitted with the understanding that it will not be used to interpret or limit the scope or meaning of the claims.

In the foregoing description of the embodiments, various features are groups together in a single embodiment for the purpose of streamlining the disclosure. This method of disclosure is not to be interpreted as reflecting that the claimed embodiments have more features than are expressly recited in each claim. Thus the following claims are hereby incorporated into the Description of the Embodiments, with each claim standing on its own as a separate exemplary embodiment.

What is claimed is:

1. A method of capturing, with a conductive fingerprint sensor having a return/supply contact and a plurality of contact pads, an image representative of skin, wherein the skin has ridges and valleys, the method comprising:
   placing the return/supply contact and one or more of the plurality of contact pads in electrical contact with the skin;
   measuring an electrical parameter of the skin in electrical contact with the return/supply contact and one or more of the contact pads; and
   storing data as a function of electrical contact of the skin ridges to the contact pads,
   wherein the measuring and storing data includes
      applying a direct current voltage source to the skin;
      measuring the electrical parameter of skin in electrical contact with the return/supply contact and one or more of the contact pads in response to applying the direct current voltage source;
      determining whether the measurements resulting from applying the direct current voltage source are unsatisfactory;
      applying an alternating current voltage source to the skin if the measurements resulting from applying the direct current voltage source are unsatisfactory; and
      correlating both the direct current and alternating current measurements.

2. The method of claim 1, wherein the method further comprises generating an image representative of the stored data.

3. The method or claim 2, wherein generating an image includes calculating a probability that the image generated was captured from the skin of a real person.

4. The method of claim 1 wherein storing data includes applying an auto-ranging scheme to place the sense amplifiers in a preferred range of operation.

5. The method of claim 1, wherein storing data includes detecting shorts.

6. The method or claim 1, wherein storing data includes detecting contamination and issuing a request for maintenance.

7. The method of claim 1, wherein scoring data includes storing data as a function of electrical contact of the skin ridges to the contact pads over two different periods of time and wherein the method further comprises comparing the data stored over each of the periods of time.

8. The method of claim 1, wherein storing data includes:
   detecting skin placed in electrical contact with one or more contact pads; and while the skin remains in electrical contact with one or more contact pads, capturing scan data representative of the skin in electrical contact with one or more contact pads.

9. A conductive skin print sensor, comprising:
   a plurality of contact pads;
   a return/supply contact;
   one or more sense amplifiers connected between the contact pads and the return/supply contact; and
   a capture circuit, connected to the sense amplifiers, for capturing data representative of skin in electrical contact with the return/supply contact and one or more of the contact pads,
   wherein the capture circuit measures an electrical parameter of skin in electrical contact with the return/supply contact and one or more of the contact pads in response to applying a direct current voltage source,
   the capture circuit determines whether the measurements resulting from applying the direct current voltage source are unsatisfactory, and
   if the measurements resulting from applying the direct current voltage source are unsatisfactory, the capture circuit applies an alternating current voltage source to the skin, and both the direct current and alternating current measurements are correlated.

10. The conductive skin print sensor of claim 9, wherein the sensor further includes an imaging module, connected to the capture circuit, for receiving data representative of skin in electrical contact with one or more of the contact pads and for converting the data received into data representative of a skin print.

11. The conductive skin print sensor of claim 10, wherein the contact pads are arranged as a two-dimensional array.

12. The conductive skin print sensor of claim 9, wherein the sensor further includes an anisotropic layer deposited on top of the contact pads.

13. The conductive skin print sensor of claim 12, wherein the anisotropic layer includes sections of increased conductivity, wherein the sections of increased conductivity are positioned over the contact pads.

14. The conductive skin print sensor of claim 13, wherein the sense amplifiers operate in both AC and DC modes to perform continuous measurements in AC mode and to perform binary measurements in DC mode measure, wherein the sensor correlates AC and DC measurements.

15. The conductive skin print sensor of claim 12, wherein the anisotropic layer includes material selected from the group consisting of intermolecular charge-transfer complexes and conductive polymers.

16. The conductive skin print sensor of claim 9, wherein the contact pads are arranged as a linear array.

17. A system for authenticating users as a function of a skin print, wherein the skin has ridges and valleys the system comprising:
   a conductive skin print sensor, wherein the conductive skin print sensor includes:
      a plurality of contact pads;
      a return/supply contact; and
      a capture circuit for capturing data representative of skin in electrical contact with the return/supply contact and one or more of the contact pads, wherein the capture circuit measures an electrical parameter of skin in electrical contact with the return/supply contact and one or more of the contact pads in response to applying a direct current voltage source,
      the capture circuit determines whether the measurements resulting from applying the direct current voltage source are unsatisfactory, and if the measurements resulting from applying the direct current voltage source are unsatisfactory, the capture circuit applies an alternating current voltage source to the skin, and both the direct current and alternating current measurements are correlated;

an imaging module, connected to the capture circuit, for receiving data representative of skin in electrical contact with one or more of the contact pads and for converting the data received into data representative of a skin print; and an authentication device connected to the imaging module, wherein the authentication device receives data representative of a skin print from the imaging module and authenticates a user as a function of the data received.

18. The system of claim 17, wherein the imaging module is connected to the authentication device across a network.

19. The system of claim 17, wherein the sensor further includes an anisotropic layer deposited on top of the contact pads.

20. The system of claim 19, wherein the anisotropic layer includes sections of increased conductivity, wherein the sections of increased conductivity are positioned over the contact pads.

21. The system of claim 19, wherein the anisotropic layer includes material selected from the group consisting of intermolecular charge-transfer complexes and conductive polymers.

22. A conductive skin print sensor, comprising:
a plurality of contact pads;
a return/supply contact;
sensing means for sensing skin in electrical contact with the return/supply contact and one or more of the contact pads; and
capture means, connected to the sensing means, for capturing data representative of skin in electrical contact with the return/supply contact and one or more of the contact pads, wherein the capture means measures an electrical parameter of skin in electrical contact with the return/supply contact and one or more of the contact pads in response to applying a direct current voltage source,
the capture means determines whether the measurements resulting from applying the direct current voltage source are unsatisfactory, and
if the measurements resulting from applying the direct current voltage source are unsatisfactory, the capture means applies an alternating current voltage source to the skin, and both the direct current and alternating current measurements are correlated.

23. The conductive skin print sensor of claim 22, wherein the sensor further includes imaging means, connected to the capture circuit, for receiving data representative of skin in electrical contact with one or more of the contact pads and for converting the data received into data representative of a skin print.

24. The conductive skin print sensor of claim 23, wherein the sensor further includes authentication means, connected to the imaging means, for authenticating a user, wherein the authentication means receives data representative of a skin print associated with a user from the imaging means and authenticates the user as a function of the data received.

* * * * *

UNITED STATES PATENT AND TRADEMARK OFFICE
CERTIFICATE OF CORRECTION

PATENT NO. : 7,496,216 B2  Page 1 of 1
APPLICATION NO. : 11/157649
DATED : February 24, 2009
INVENTOR(S) : Sui-hing Leung et al.

It is certified that error appears in the above-identified patent and that said Letters Patent is hereby corrected as shown below:

In column 9, line 10, delete "groups" and insert -- grouped --, therefor.

In column 9, line 49, in Claim 3, delete "or" and insert -- of --, therefor.

In column 9, line 57, in Claim 6, delete "or" and insert -- of --, therefor.

In column 9, line 60, in Claim 7, delete "scoring" and insert -- storing --, therefor.

In column 10, line 52, in Claim 17, after "valleys" insert -- , --.

Signed and Sealed this

Twenty-fifth Day of August, 2009

David J. Kappos
*Director of the United States Patent and Trademark Office*